United States Patent [19]
Carroll et al.

[11] Patent Number: 5,415,374
[45] Date of Patent: May 16, 1995

[54] FLUSH VALVE IMPROVEMENTS FOR CONTROLLING FLUSHING VOLUME

[75] Inventors: Daniel J. Carroll, Hammond, Ind.; Jerry P. Gronwick, Park Ridge, Ill.

[73] Assignee: Sloan Valve Company, Franklin Park, Ill.

[21] Appl. No.: 276,626

[22] Filed: Jul. 18, 1994

[51] Int. Cl.$^6$ .......................... F16K 31/143
[52] U.S. Cl. ............................................ 251/40
[58] Field of Search ............... 251/40, 45, 39, 38; 285/23, 910; 220/304, 308

[56] References Cited

U.S. PATENT DOCUMENTS

| | | | |
|---|---|---|---|
| 1,157,574 | 10/1915 | Mueller | 285/910 X |
| 1,937,044 | 11/1933 | Miller | 251/40 X |
| 2,433,507 | 12/1947 | Delany | 251/45 X |
| 2,918,250 | 12/1959 | Hosking | 251/41 X |
| 4,088,327 | 5/1978 | Bachle | 285/23 X |
| 4,261,545 | 4/1981 | Allen | 251/40 |
| 5,161,711 | 11/1992 | Picozza et al. | 220/282 |
| 5,342,096 | 8/1994 | Bachle et al. | 285/23 |

*Primary Examiner*—Martin P. Schwadron
*Assistant Examiner*—Kevin L. Lee
*Attorney, Agent, or Firm*—Dorn, McEachran, Jambor & Keating

[57] ABSTRACT

A flush valve includes a body with an inlet and an outlet and a valve seat at the outlet. There is a valve movable in the body toward and away from the valve seat to control flow through the flush valve. There is a chamber in the body above the valve and there is a refill orifice in the valve connecting the chamber with said body inlet. Pressure in the chamber maintains the valve closed upon its valve seat, with the size of the refill orifice controlling the time to fill the chamber from the inlet which determines the time of flow of water from the inlet through the outlet. There is a relief valve for venting the chamber to the outlet when the relief valve is open, thereby causing the valve to move away from its seat permitting flow from the inlet through the outlet. There is a cover threadedly attached to the body and a seal element formed from an elastomeric material positioned between the cover and the body. The seal element has a surface finish with sufficient lubricity such that the cover will slide upon its surface when the cover is threadedly attached to the body. The seal element is sufficiently elastomeric such that it distorts under pressure from the cover to form a tight seal between the cover and the body.

2 Claims, 2 Drawing Sheets

FLUSH VALVE IMPROVEMENTS FOR CONTROLLING FLUSHING VOLUME

BACKGROUND OF THE INVENTION

U.S. Pat. No. 4,261,545 owned by Sloan Valve Company of Franklin Park, Ill., assignee of the present application discloses a flush valve which is sold by that company under the trademark "GEM". There is a piston which opens and closes the flush valve, with the piston normally being maintained in a closed position by water pressure at the inlet. Inlet pressure is applied to a piston chamber through a small orifice in the wall of the piston. There is a relief valve which is used to vent the piston chamber permitting the piston to move away from its valve seat and to thus open the valve.

In the flush valve shown in the '545 patent the cover is sealed to the body by means of a two-ring peripheral seal. One of the two rings is a slip ring and the other is a gasket. As the cover is turned down it slides upon the upper surface of the slip ring which then applies distorting pressure to the gasket. The slip ring is necessary, as otherwise if the cover is turned down directly upon the gasket, the surface of the gasket would be torn and the seal would be lost.

The present invention provides a single seal member which performs both of the functions of the prior art slip ring and gasket. This single seal element has a surface finish which provides the required lubricity for the cover to slide upon its surface. The seal element also has the necessary elastomeric and distortion characteristics so as to form a tight seal between the cover and the body.

The single element seal of the present invention not only provides the desired sealing characteristics, but eliminates one of the two parts required in prior seal constructions. The elimination of a part is important, as often in assembly of the valve, either in the field or prior to shipment, one of the two parts could be inadvertently damaged or misplaced. By having a single part perform a dual function, there is not only a part and labor cost saving, but also insurance that the valve will be shipped and assembled in a workable manner.

Further, in the prior art seal construction such as shown in the '545 patent, the gasket was placed in a pocket with the result that the normal mushrooming of a distortable element forced the gasket against the side walls of the body. This may be advantageous if the elements are assembled in the correct alignment, but can cause a leaky valve if the sealing elements are mounted contrary to assembly specifications. The use of the single seal element of the present invention does not require a specific assembly process and can in fact be installed with either side facing down or up, an essentially error-free installation process.

SUMMARY OF THE INVENTION

The present invention relates to flush valves of the type used to flush urinals and water closets and more particularly to an improved seal between the cover and body of the flush valve.

A primary purpose of the invention is a flush valve which eliminates the prior art two-ring seal between the cover and body and replaces these elements with a single sealing element which has sufficient lubricity so that the cover may slip upon it and sufficient elastomeric and distortion characteristics so as to provide a seal between the body and the cover.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
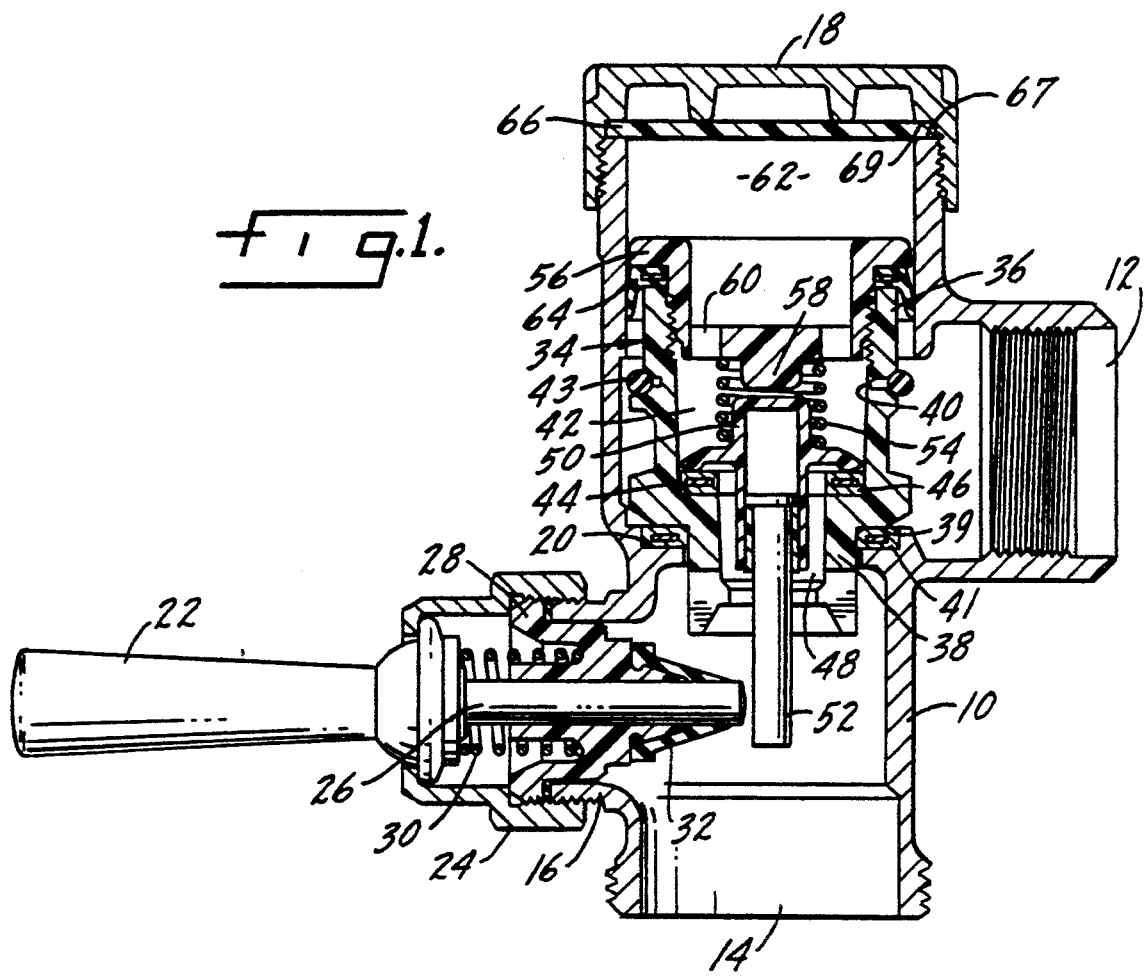
FIG. 1 is a vertical section through a flush valve as described herein.

The present invention will be described with a particular type of flush valve using a piston assembly. It should be understood, however, that the characteristics of the invention are equally applicable to other types of flush valves.

The flush valve of the present invention is conventionally used either with urinals or with water closets. It has a generally hollow valve body 10 which includes an inlet connection 12, an outlet connection 14 and a handle coupling connection 16. The top of the valve body is closed by a cover 18. A main valve seat 20 is formed on the interior walls of the body 10. The valve is actuated by an operating handle 22 which is fastened to the valve body 10 by means of a coupling nut 24. The handle is connected to a plunger 26 which extends to the interior portion of the valve body. The plunger 26 is guided and supported by a bushing 28 and restored by a spring 30. A rubber sealing cap or packing 32 is snapped on the end of bushing 28 and prevents leakage outward from the handle opening.

A piston assembly indicated generally at 34 is adapted to reciprocate within the body 10. The assembly 34 includes a hollow, generally cylindrical piston unit 36. The piston 36 has a lower cylindrical extension 38 which is directly adjacent a piston shoulder 39, with the shoulder 39 being normally seated upon a seal member 41 to close the main valve seat 20 and to thereby control the flow of water through the flush valve. The piston 36 has a bypass orifice 40 controlled by a seal ring 43, as described in U.S. Pat. No. 4,261,545. The bypass orifice connects the inlet side of the flush valve with the interior chamber 42 of the piston. The bypass has a small diameter which may range in size from 0.020" to as much as 0.0245", with the size of the diameter determining the rate at which chamber 42 fills to cause closure of the flush valve.

The interior chamber 42 of the piston 36 has an annular ledge 44 supporting a seal 46. The ledge and seal are at the top of a central passage 48 which connects chamber 42 with the outlet side of the flush valve.

The piston assembly 34 also includes a relief valve 50 which normally closes passage 48 of the piston 36. The relief valve has a collar which engages the seal 46 on the annular ledge of the piston. An operating stem 52 is slidable in the central hollow portion of the relief valve 50 and extends to a point adjacent plunger 26. A spring 54 assists in holding the relief valve 50 in its position to close and seal chamber 42.

The piston assembly 34 further includes an insert 56 threadedly engaging the upper piston wall. The insert 56 has a central stop 58 against which the spring 54 abuts. The stop has holes 60 which provide fluid communication between the piston interior chamber 42 and an upper pressure chamber 62. A packing member 64 held between the insert 56 and piston 36 provides a slidable seal separating the pressure chamber 62 from the inlet water pressure.

FIG. 1 illustrates the normally closed position of the flush valve. Piston 36 is upon the valve seat formed by seal 41 so that there is no communication between the inlet and outlet ports of the valve. Chambers 42 and 62 are pressurized by inlet water flowing through refill orifice 40. The pressure in these chambers maintains the piston upon its valve seat and maintains the relief valve 50 firmly closed on its seat. Because of the greater pressure responsive area on top of the piston assembly 34 compared to the area around the valve seat 20, the pressure differential firmly holds the piston closed on the valve seat.

When the operating handle 22 is moved, it forces the plunger 26 inward against the relief valve stem 52, thereby tilting the relief valve 50 off its seat on seal 46. This permits the pressure in chamber 62 to be relieved through holes 60, the piston interior chamber 42 and the lower opening 48 into the outlet 14 of the flush valve. Inlet water pressure can now raise the piston assembly 34 off of the valve seat 20, permitting full water flow from the inlet 12 to the outlet 14 to flush the fixture to which the flush valve is connected.

In prior flush valve constructions, such as shown in U.S. Pat. No. 4,261,545, the cover was sealed to the body by means of a two-ring peripheral seal. One of the two rings was a slip ring and the other was a gasket. As the cover was turned down, it would slide upon the upper surface of the slip ring which then would apply distorting pressure to the gasket. The slip ring was necessary, as otherwise if the cover was turned down directly upon the gasket, the surface of the gasket would be torn and the seal would be lost. The gasket of the two-part seal is normally placed in a pocket formed in the cover and the normal mushrooming that takes place when a distorting force is applied to the gasket forced it to extrude along the side walls of the pocket. This may be advantageous if the elements are assembled correctly, but could be the cause of a leak if the combination slip ring and gasket was installed contrary to assembly specifications.

In the present invention a single solid disc 66 performs both of the functions of the prior art slip ring and gasket. The disc 66 is seated upon the upper end 67 of body 10 and is positioned within a recess 69 in cover 18.

The seal element 66 has a surface finish which provides the required lubricity for the cover to slide upon its surface. The element 66 also has the necessary elastomeric and distortion characteristics so as to form a tight seal between the cover and the body. A preferred material for forming the single seal element or gasket is a high durometer, low density polyethylene. Although this material is highly advantageous, other materials may be satisfactory providing they have the necessary surface lubricity and elastomeric characteristics to distort under pressure.

Figure 3:
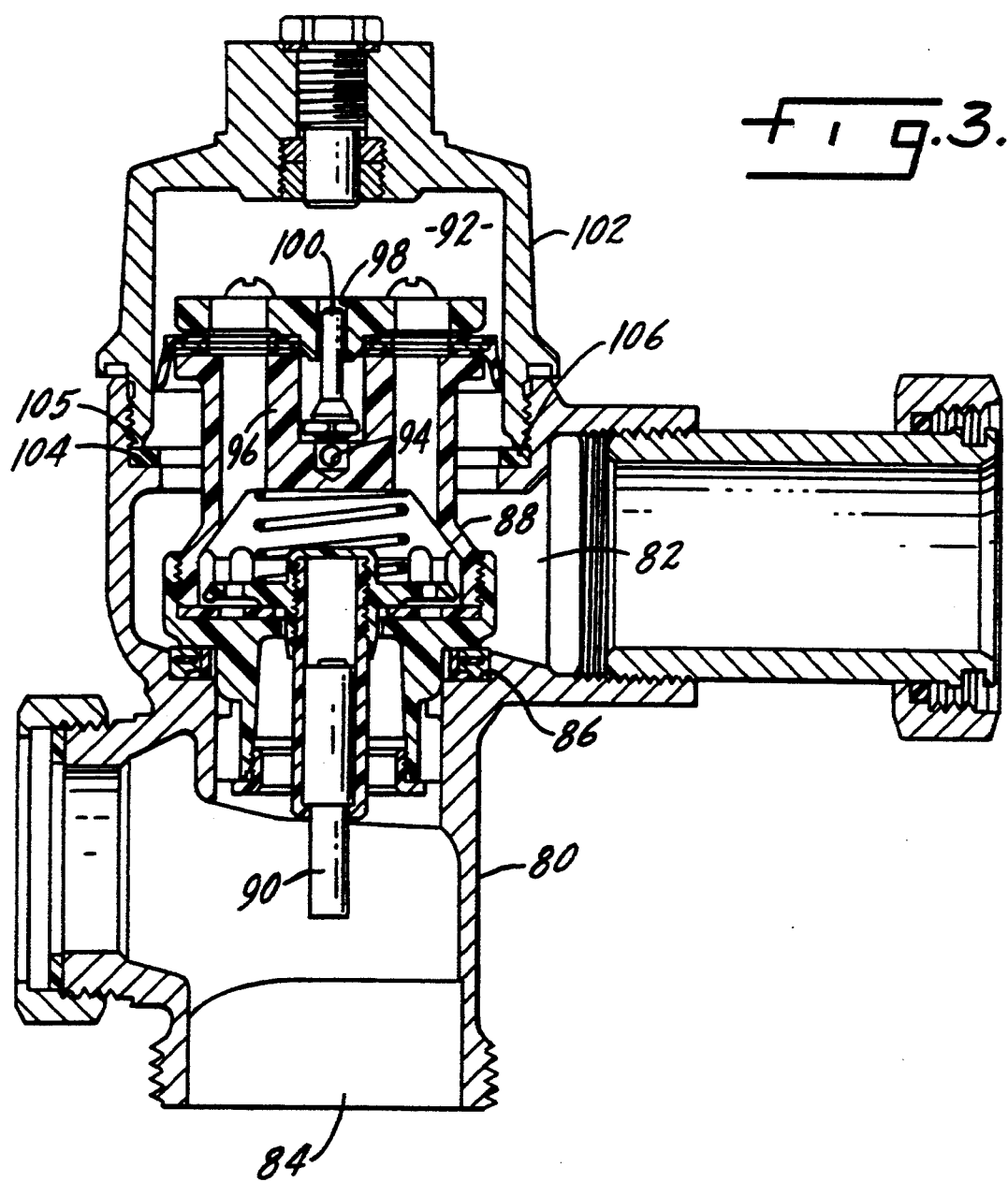
FIG. 3 is a vertical section through a modified form of flush valve.
Figure 4:
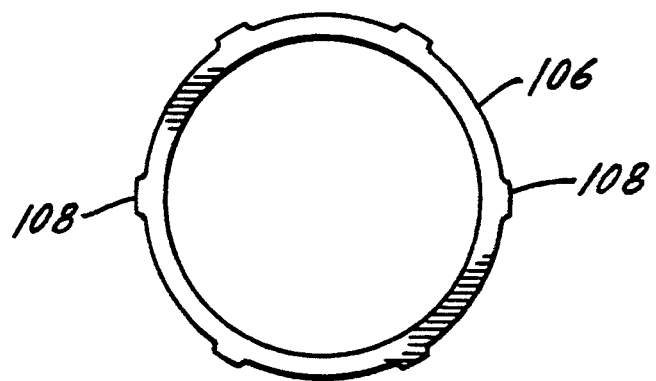
FIG. 4 is a plan view of the seal used in the flush valve of FIG. 3.

FIGS. 3 and 4 show a modified form of the invention and in particular show a flush valve which is marketed by the assignee of the present application, Sloan Valve Company, under the trademark "CROWN NAVAL".

Figure 2:
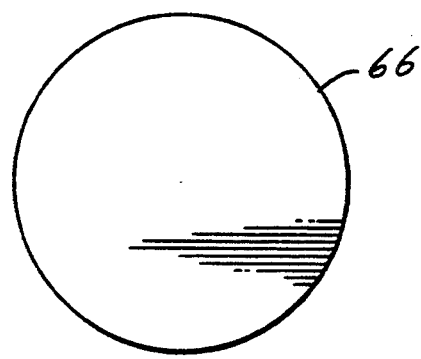
FIG. 2 is a plan view of the seal used in the flush valve of FIG. 1.

Reference is made to U.S. Pat. No. 2,738,946 for a more detailed disclosure of this specific piston-type flush valve. The flush valve of FIGS. 3 and 4 includes a body 80 having an inlet opening 82 and an outlet 84. A valve seat 86 is formed in the body 80 and includes a seal element which cooperates with the piston assembly indicated generally at 88. The operation of the piston assembly in the embodiment of FIGS. 3 and 4 is generally the same as that shown in FIGS. 1 and 2 in that tripping of the relief valve 90, conventionally by an operating handle such as shown at 22 in FIG. 1, causes the pressure in chamber 92 to vent through opening 84, permitting the piston to rise away from seat 86, to thus provide a clear path of communication between the inlet and outlet of the flush valve. The bypass orifice connecting inlet 82 with pressure chamber 92 includes a small opening 94 in the central portion 96 of the piston assembly with water passing from opening 94 through the clearance between a passage 98 in the piston assembly and the exterior diameter of a pin 100 loosely positioned in the passage.

The body 80 has a flange 104 upon which is positioned a seal ring 106. The end 105 of the cover 102, which is threadedly attached to the body, bears upon the seal ring. The seal ring 106 is formed of the same material and provides essentially duplicate functions as the seal element 66 in the FIG. 1 embodiment. Again, it is important that the seal ring have the necessary elastomeric and distortion characteristics so as to form a tight seal between the cover and the body. A preferred material is a high durometer, low density polyethylene. As illustrated in FIG. 3, the seal ring 106 has a plurality of outwardly extending lobes 108 so that the ring may be installed in the undercut 104 in the valve body. The lobes provide a means for locating the ring in a fixed position in the cover and hold the ring in the cover during installation.

The present invention provides both of the characteristics of the former two-part slip ring and gasket in a single element. This single seal element can be installed with either side up as it is uniform in characteristic, thus providing an essentially error-free installation. This single element not only provides the desired sealing characteristic, but eliminates one of the two parts required in prior seal constructions. The elimination of a part is important, as often in assembly of the valve, either in the field or prior to shipment, one of the two parts could be inadvertently damaged or misplaced. By having a single part perform a dual function there is not only a part and labor cost saving, but also insurance that the valve will be shipped and assembled in a workable condition.

Whereas the preferred form of the invention has been shown and described herein, it should be realized that there may be many modifications, substitutions and alterations thereto.

The embodiments of the invention in which an exclusive property or privilege is claimed are defined as follows:

1. A flush valve including a body having an inlet and an outlet, a valve seat at said outlet, valve means movable in said body toward and away from said valve seat to control flow from said inlet through said outlet, a chamber in said body above said valve means, a refill orifice in said valve means connecting said chamber with said body inlet, pressure in said chamber maintaining said valve means closed upon said valve seat, the size of said refill orifice controlling the time to fill said chamber from said inlet which determines the time of flow of water from said inlet through said outlet, a relief valve associated with said valve means for venting said chamber to said outlet, means for opening said relief valve to vent said chamber causing said valve means to move away from said valve seat to open flow through said outlet, a cover threadedly attached to said body, and a seal member formed from a low density polyethylene elastomeric material positioned between said cover and said body, said seal member having a surface finish with sufficient lubricity such that the cover will slide upon its surface when the cover is threadedly attached to said body, said seal member having sufficient elastomeric characteristics such that it distorts under pressure from said cover to form a tight seal between said cover and said body, said seal member being a solid disc positioned on top of said body, said cover having a recess, said disc being positioned in said recess when said cover is threadedly attached to said body.

2. The flush valve of claim 1 characterized in that said valve means includes a piston movable toward and away from said valve seat, said piston including a refill orifice connecting said chamber with said body inlet.

* * * * *